US010295213B2

(12) United States Patent
Makino et al.

(10) Patent No.: US 10,295,213 B2
(45) Date of Patent: May 21, 2019

(54) AIR CONDITIONING APPARATUS (71) Applicant: Mitsubishi Electric Corporation, Tokyo (JP)

(72) Inventors: Yasushi Makino, Tokyo (JP); Kenta Owada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/558,006

(22) PCT Filed: Jun. 26, 2015

(86) PCT No.: PCT/JP2015/068482
§ 371 (c)(1),
(2) Date: Sep. 13, 2017

(87) PCT Pub. No.: WO2016/208058
PCT Pub. Date: Dec. 29, 2016

(65) Prior Publication Data
US 2018/0080671 A1 Mar. 22, 2018

(51) Int. Cl.
*F24F 11/30* (2018.01)
*F25B 49/02* (2006.01)
(Continued)

(52) U.S. Cl.
CPC .............. *F24F 11/30* (2018.01); *F24F 11/62* (2018.01); *F25B 49/025* (2013.01); *F24F 11/46* (2018.01);
(Continued)

(58) Field of Classification Search
None
See application file for complete search history.

(56) References Cited

U.S. PATENT DOCUMENTS

| 9,470,444 | B1 | 10/2016 | Takata et al. |
| 2015/0008762 | A1 | 1/2015 | Higashiyama et al. |
| 2016/0238300 | A1* | 8/2016 | Makino .................. H02M 1/36 |

FOREIGN PATENT DOCUMENTS

| EP | 2 803 917 A1 | 11/2014 |
| EP | 2 864 713 B1 | 3/2017 |

(Continued)

OTHER PUBLICATIONS

International Search Report of the International Searching Authority dated Sep. 29, 2015 for the corresponding international application No. PCT/JP2015/068482 (and English translation).

(Continued)

*Primary Examiner* — Daniel Kessie
(74) *Attorney, Agent, or Firm* — Posz Law Group, PLC (57) ABSTRACT An air conditioning apparatus, being a power efficient and highly resistant to external noise, includes: an outdoor device; and indoor devices. The outdoor device includes: a first current path, through which AC power is supplied; and a second current path, through which AC power is supplied from the AC power supply to the control-power-supply generation unit through a first noise reduction unit, a second outdoor power-feed switching relay, and a surge-current suppression resistor. When there is a possibility an inrush current to the control-power-supply generation unit to be generated, the outdoor device supplies AC power of the AC power supply to the control-power-supply generation unit through the first current path. When there is not a possibility for an inrush current to the control-power-supply generation unit to be generated, the outdoor device supplies AC power of the AC power supply to the control-power-supply generation unit through the second current path.

10 Claims, 4 Drawing Sheets (51) Int. Cl.
*F24F 11/62* (2018.01)
*F24F 11/46* (2018.01)
*F24F 11/85* (2018.01)
*H02M 7/04* (2006.01)

(52) U.S. Cl.
CPC .......... *F24F 11/85* (2018.01); *F25B 2500/26* (2013.01); *H02M 7/04* (2013.01)

(56) References Cited

FOREIGN PATENT DOCUMENTS

| | | |
|---|---|---|
| JP | H11-127581 A | 5/1999 |
| JP | 2010-038484 A | 2/2010 |
| JP | 2012-117704 A | 6/2012 |
| JP | 2013-152054 A | 8/2013 |
| JP | 2014-007840 A | 1/2014 |
| JP | 2014-156963 A | 8/2014 |
| JP | 2014-202459 A | 10/2014 |
| WO | 2015/118906 A1 | 8/2015 |

OTHER PUBLICATIONS

Extended European Search Report dated May 29, 2017 issued in corresponding EP patent application No. 15864312.2.
Office action dated Aug. 24, 2018 issued in corresponding Australian (AU) patent application No. 2015400127.

\* cited by examiner

AIR CONDITIONING APPARATUS

CROSS REFERENCE TO RELATED APPLICATION

This application is a U.S. national stage application of International Patent Application No. PCT/JP2015/068482 filed on Jun. 26, 2015, the disclosure of which is incorporated herein by reference.

TECHNICAL FIELD

The present invention relates to an air conditioning apparatus including an outdoor device and indoor devices.

BACKGROUND

Conventionally, there is a commonly-known air conditioning apparatus that includes one outdoor device to which an AC power supply is connected, and a plurality of indoor devices connected to this outdoor device. In the air conditioning apparatus as described above, a technique has been proposed to limit the power supply to the outdoor device during the operation standby period in which both the outdoor device and the indoor devices do not operate.

As an example, Patent Literature 1 discloses an air conditioning apparatus that stops the supply of power to an outdoor device during standby. The problem of Patent Literature 1 is "to provide an air conditioning apparatus that is capable of reducing reactive power consumption in an outdoor device when this outdoor device is on standby while indoor devices are in operation". In Patent Literature 1, there has been disclosed a technique "an air conditioning apparatus 1 including indoor devices A2 and B3, and an outdoor device 4, where the indoor devices A2 and B3, and the outdoor device 4 are connected by three cores that are a power-supply line 14, a power-supply signal common line 15, and a signal line 16, and power having been supplied from a commercial power supply 13 to either the outdoor device 4 or the indoor devices A2 and B3 is supplied to the other through the power-supply line 14 and the power-supply signal common line 15, wherein the outdoor device 4 includes an inrush-current prevention relay B18 and an outdoor relay B22, each of which connects or disconnects the commercial power supply 13 to or from an outdoor rectifying unit B25 for an outdoor control unit 29, and an inrush-current prevention relay A17 and an outdoor relay A21, each of which connects or disconnects the commercial power supply 13 to or from an outdoor rectifying unit A24 for an inverter circuit 28, and wherein a noise filter 23 is positioned closer to the outdoor rectifying unit A24 relative to the inrush-current prevention relay A17 and the outdoor relay A21". That is, according to the technique in Patent Literature 1, a supply of power to the outdoor device is interrupted by the relays during the operation standby period, and therefore power is supplied only to the indoor devices so as to achieve power savings. Also, at the time of resuming the operation, the relays are operated to supply power to an outdoor-device control unit via the indoor devices, thereby immediately resuming the operation from standby.

PATENT LITERATURE

Patent Literature 1: Japanese Patent Application Laid-open No. 2014-202459

However, according to the above described conventional technique, the outdoor-device control unit is connected to the commercial AC power supply not via the noise filter. Therefore, there is a problem in that external noise derived from the commercial AC power supply causes a malfunction and a failure of the parts.

SUMMARY

The present invention has been achieved to solve the above problems, and an object of the present invention is to provide an air conditioning apparatus that is power efficient and is highly resistant to external noise.

To solve the above described problem and achieve the object, an air conditioning apparatus according to the present invention includes: an outdoor device that is connected to an AC power supply; and a plurality of indoor devices that are connected to the AC power supply through the outdoor device. The outdoor device includes: a first current path through which AC power is supplied from the AC power supply to a control-power-supply generation unit through any one of the plurality of indoor devices, a first outdoor power-feed switching relay, and an inrush-current suppression resistor; and a second current path through which AC power is supplied from the AC power supply to the control-power-supply generation unit through a noise reduction unit, a second outdoor power-feed switching relay, and a surge-current suppression resistor having a lower impedance than the inrush-current suppression resistor. By controlling on-off of the first outdoor power-feed switching relay and the second outdoor power-feed switching relay: the outdoor device supplies AC power of the AC power supply to the control-power-supply generation unit through the first current path when there is a possibility for an inrush current to the control-power-supply generation unit to be generated; and the outdoor device supplies AC power of the AC power supply to the control-power-supply generation unit through the second current path when there is not a possibility for an inrush current to the control-power-supply generation unit to be generated.

The air conditioning apparatus according to the present invention is power efficient and is highly resistant to external noise.

DETAILED DESCRIPTION

Exemplary embodiments of an air conditioning apparatus according to the present invention will be explained below in detail with reference to the accompanying drawings. The present invention is not limited to the embodiments.

Embodiment

Figure 1:
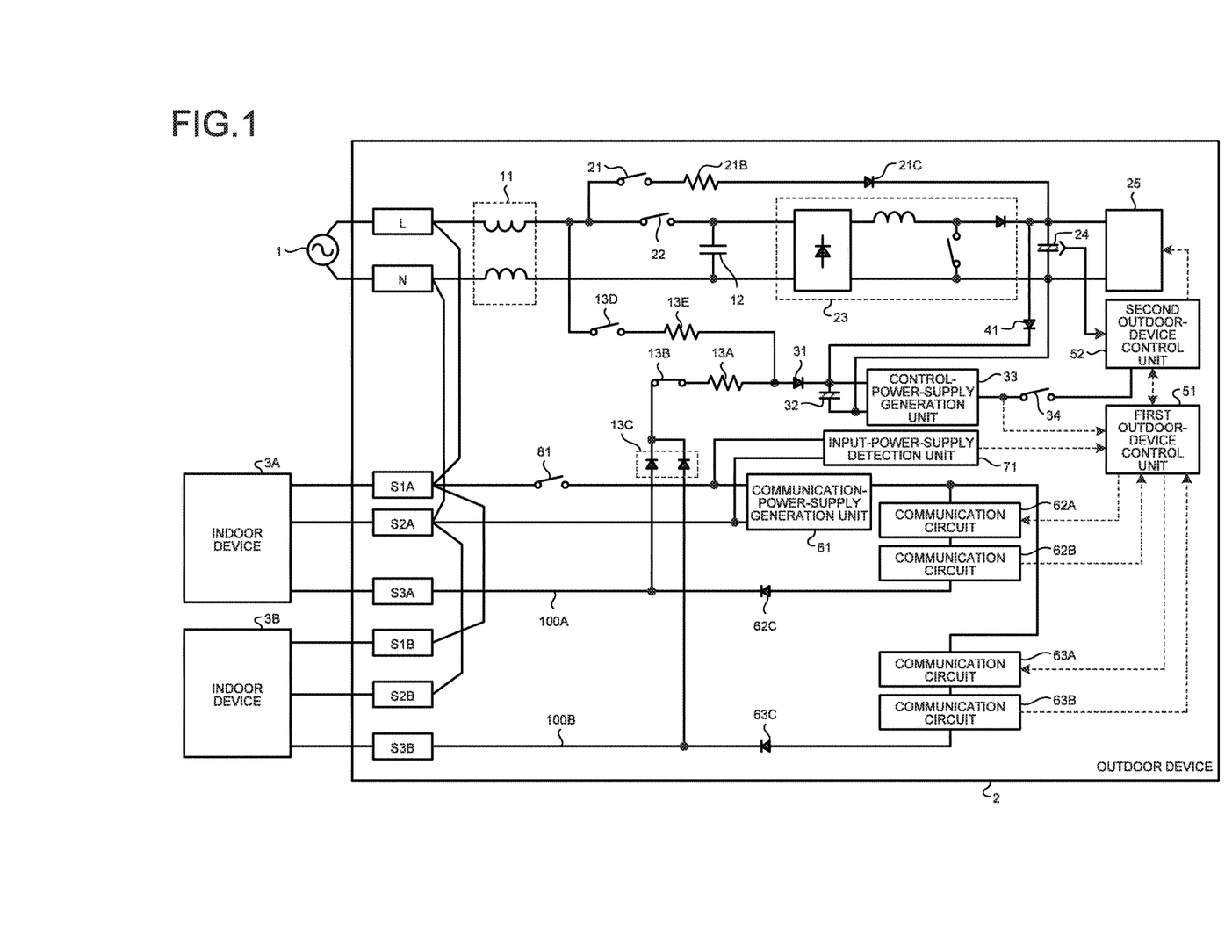
FIG. 1 is a diagram illustrating a configuration example of an air conditioning apparatus according to an embodiment.

FIG. 1 is a diagram illustrating a configuration example of an air conditioning apparatus according to an embodiment of the present invention. The air conditioning apparatus illustrated in FIG. 1 includes an outdoor device 2, and indoor devices 3A and 3B. An AC power supply 1 is connected to the outdoor device 2 through a terminal L and a terminal N. The indoor device 3A is connected to the outdoor device 2 through terminals S1A, S2A, and S3A. The indoor device 3B is connected to the outdoor device 2 through terminals S1B, S2B, and S3B. The terminal L is connected to the terminals S1A and S1B. The terminal N is connected to the terminals S2A and S2B. A communication line 100A is connected to the terminal S3A. A communication line 100B is connected to the terminal S3B. The indoor devices 3A and 3B are supplied with power from the AC power supply 1 via the outdoor device 2.

The outdoor device 2 includes: a first noise reduction unit 11 that is connected to the terminals L and N; a second noise reduction unit 12 that is provided at the subsequent stage of the first noise reduction unit 11; a second AC power-supply relay 22 that is provided between the first noise reduction unit 11 and the second noise reduction unit 12; a first AC power-supply relay 21 that is provided parallel to the second AC power-supply relay 22; a first inrush-current suppression resistor 21B that is provided at the subsequent stage of the first AC power-supply relay 21; a diode 21C that is provided at the subsequent stage of the first inrush-current suppression resistor 21B; a first AC-DC conversion unit 23 that includes a chopper circuit capable of boosting the voltage; a first DC-voltage smoothing unit 24 that is provided at the subsequent stage of the first AC-DC conversion unit 23; a compressor driving unit 25 that drives a compressor (not illustrated) by using power from the first DC-voltage smoothing unit 24; a second outdoor power-feed switching relay 13D that is provided parallel to the first AC power-supply relay 21 and the second AC power-supply relay 22; a surge-current suppression resistor 13E that is provided at the subsequent stage of the second outdoor power-feed switching relay 13D; a diode 31 that is provided at the subsequent stage of the surge-current suppression resistor 13E; a control-power-supply generation unit 33 that is provided at the subsequent stage of the diode 31; a second DC-voltage smoothing unit 32 that is provided at the previous stage of the control-power-supply generation unit 33, and that generates power to the control-power-supply generation unit 33; a first outdoor-device control unit 51 and a second outdoor-device control unit 52, each of which controls the operation of the outdoor device 2 by using power from the control-power-supply generation unit 33; a control-power-supply relay 34 that controls a supply and an interruption of power from the control-power-supply generation unit 33 to the second outdoor-device control unit 52; a diode 41 anode thereof is connected to the positive-voltage side of the first DC-voltage smoothing unit 24, and cathode thereof is connected to the positive-voltage side of the second DC-voltage smoothing unit 32; a communication-power-supply generation unit 61 that generates DC power for supplying to communication circuits 62A, 62B, 63A, and 63B by using an AC voltage from the AC power supply 1; the communication circuits 62A and 63A that transmit a communication signal to the indoor devices 3A and 3B, respectively, and the communication circuits 62B and 63B that receive a communication signal; the communication line 100A that is provided between the communication circuit 62B and the terminal S3A; the communication line 100B that is provided between the communication circuit 63B and the terminal S3B; a diode 62C that is provided on the communication line 100A, where anode thereof is connected to the communication circuit 62B, and cathode thereof is connected to the terminal S3A; a diode 63C that is provided on the communication line 100B, where anode thereof is connected to the communication circuit 63B, and cathode thereof is connected to the terminal S3B; a diode group 13c anode thereof is connected between the cathode of the diode 62C and the terminal S3A; a first outdoor power-feed switching relay 13B that is connected to the cathode of the diode group 13c; a second inrush-current suppression resistor 13A that is connected between the first outdoor power-feed switching relay 13B and the anode of the diode 31; a communication-power-supply relay 81 that is provided between the terminal S1A and the communication-power-supply generation unit 61, and that controls a supply and an interruption of power to the communication-power-supply generation unit 61; and an input-power-supply detection unit 71 that is connected between the communication-power-supply generation unit 61 and the communication-power-supply relay 81, and between the communication-power-supply generation unit 61 and terminal S2A, and that measures the voltage of AC power supplied to the communication-power-supply generation unit 61.

The first AC-DC conversion unit 23 may be exemplified by an interleaved converter.

In the above described configuration, on-off of the first AC power-supply relay 21 and the second AC power-supply relay 22 is controlled by the second outdoor-device control unit 52. On-off of the second outdoor power-feed switching relay 13D, the control-power-supply relay 34, the first outdoor power-feed switching relay 13B, and the communication-power-supply relay 81, is controlled by the first outdoor-device control unit 51. In the following descriptions, a state where the contact of a relay is closed is referred to as "relay on" and a state where the contact of a relay is opened is referred to as "relay off".

In a non-operating state without a power supply to the second outdoor-device control unit 52, the first AC power-supply relay 21 and the second AC power-supply relay 22 are off, and are in an open state.

The first noise reduction unit 11 includes an inductive reactance. The inductive reactance may be exemplified by a solenoidal coil having an inductance component. As illustrated in FIG. 1, the first noise reduction unit 11 is provided closer to the AC power supply 1 than the first AC power-supply relay 21, the second AC power-supply relay 22, and the second outdoor power-feed switching relay 13D are. The second noise reduction unit 12 includes a capacitive reactance. The capacitive reactance may be exemplified by a capacitor having a capacitance component. In FIG. 1, the first noise reduction unit 11 includes a coil connected to the terminal L, and a coil connected to the terminal N. Also, the second noise reduction unit 12 includes a capacitor in which one electrode is connected to the terminal L through the first noise reduction unit 11 and the second AC power-supply relay 22, and the other electrode is connected to the terminal N through the first noise reduction unit 11.

The diode 41 is provided in order to block a current from the second DC-voltage smoothing unit 32 to the first DC-voltage smoothing unit 24 when a DC voltage of the first DC-voltage smoothing unit 24 is lower than a DC voltage of the second DC-voltage smoothing unit 32. The second inrush-current suppression resistor 13A is provided in order to suppress an inrush current that flows from the indoor devices 3A and 3B to the second DC-voltage smoothing unit 32 via the diode group 13C. The first outdoor power-feed switching relay 13B is provided in order to open and close a connection path between the second inrush-current suppression resistor 13A and the second DC-voltage smoothing unit 32. The diode group 13C is an AC-DC conversion unit provided in order to rectify AC power supplied from the indoor devices 3A and 3B via the communication lines 100A and 100B when the outdoor device 2 is in a power-supply interrupting state, that is, in a state where a supply of power from the AC power supply 1 to the first AC-DC conversion unit 23 and the diode 31 is interrupted. The second outdoor power-feed switching relay 13D is provided in order to open and close the connection path between the AC power supply 1 and the diode 31. The surge-current suppression resistor 13E has a lower impedance than the second inrush-current suppression resistor 13A, and suppresses a surge current caused by external noise when the second outdoor power-feed switching relay 13D is on. Lightning may exemplify the external noise. The surge-current suppression resistor 13E and the second inrush-current suppression resistor 13A are configured to be capable of being switched over to each other by the first outdoor power-feed switching relay 13B and the second outdoor power-feed switching relay 13D.

When in a state where no electrical charge is stored in the second DC-voltage smoothing unit 32, the AC power supply 1 is connected to the terminals L and N, then there is a possibility for an inrush current to flow to the second DC-voltage smoothing unit 32. Therefore, at the time of connecting the AC power supply 1 to the terminals L and N, the first outdoor power-feed switching relay 13B is turned on and the second outdoor power-feed switching relay 13D is turned off in order that the second inrush-current suppression resistor 13A suppresses an inrush current. Except when there is a possibility for an inrush current to flow to the second DC-voltage smoothing unit 32, the first outdoor power-feed switching relay 13B is turned off and the second outdoor power-feed switching relay 13D is turned on. Due to the operation as described above, a surge current is suppressed by the surge-current suppression resistor 13E, and therefore a failure of the parts resulting from a surge current is prevented. As described above, except when there is a possibility for an inrush current to flow to the second DC-voltage smoothing unit 32, a current flows through the surge-current suppression resistor 13E having a lower impedance. Therefore, power consumption on a power feed path to the second DC-voltage smoothing unit 32 can be reduced as compared to the case where a current flows through the second inrush-current suppression resistor 13A.

On-off of the first outdoor power-feed switching relay 13B and the second outdoor power-feed switching relay 13D is controlled by the first outdoor-device control unit 51. The first outdoor power-feed switching relay 13B is an AC power-supply relay. The second outdoor power-feed switching relay 13D is a DC power-supply relay. During the operation standby period in which it is unnecessary to drive a compressor, the first outdoor power-feed switching relay 13B is turned on and the second outdoor power-feed switching relay 13D is turned off.

While FIG. 1 illustrates the air conditioning apparatus in which two indoor devices are connected to one outdoor device, however the present invention is not limited thereto, but three or more indoor devices may be connected to one outdoor device. In this case, the outdoor device includes communication circuits according to the number of connecting indoor devices, and is configured to be capable of supplying AC power to each of the indoor devices through their respective communication lines between these communication circuits and the indoor devices. Further, in this case, the diode group 13C is connected to each of the communication lines 100A and 100B and is configured to be capable of rectifying AC power supplied from all the indoor devices.

Next, an operation of the air conditioning apparatus illustrated in FIG. 1 will be described. In the air conditioning apparatus illustrated in FIG. 1, in a state where the compressor driving unit 25 does not need to drive a compressor, a supply of power to each unit of the outdoor device 2 is interrupted, thereby reducing the standby power consumption. The state where the compressor driving unit 25 does not need to drive a compressor can be exemplified by a state where both the indoor devices 3A and 3B are not in operation. However, the present invention is not limited thereto. Depending on the operation mode or the surrounding environment, a case is also assumed where even though both the indoor devices 3A and 3B are in operation; the compressor driving unit 25 still does not need to drive a compressor. Therefore, in a state where even though both the indoor devices 3A and 3B are in operation, the compressor driving unit 25 still does not need to drive a compressor, a supply of power to each unit of the outdoor device 2 is interrupted to reduce the standby power consumption.

In a case of starting a supply of power from the AC power supply 1 to start-up the outdoor device 2, power is supplied from the indoor devices 3A and 3B to a control unit that controls open-close of relays included in the outdoor device 2. The control unit supplied with power controls open-close of the relays such that power is directly supplied from the AC power supply 1 to constituent elements included in the outdoor device 2, and power supplied from the indoor devices 3A and 3B is interrupted. The first AC power-supply relay 21 and the second AC power-supply relay 22 form a power supply-path open-close unit. The first outdoor power-feed switching relay 13B and the second outdoor power-feed switching relay 13D form a path selection unit.

In the operation to start-up the outdoor device 2, first the connection is switched over by a power-feed switching unit that is provided within the indoor devices 3A and 3B, and that switches to the power supply from the indoor devices 3A and 3B to the outdoor device 2; and then AC power having been supplied from the AC power supply 1 through the outdoor device 2 to the indoor devices 3A and 3B is supplied to the communication lines 100A and 100B. The AC power supplied from the indoor devices 3A and 3B to the communication lines 100A and 100B, respectively, is converted to a direct current by the diode group 13C in the outdoor device 2. A DC voltage having been converted by the diode group 13C is applied to the second DC-voltage smoothing unit 32 via the first outdoor power-feed switching relay 13B, the second inrush-current suppression resistor 13A, and the diode 31. The second DC-voltage smoothing unit 32 is therefore charged with this DC voltage. An inrush current generated at this time is suppressed by the second inrush-current suppression resistor 13A. At the time of supplying AC power to the communication lines 100A and 100B, the communication circuits 62A, 62B, 63A, and 63B in the outdoor device 2 do not operate. Due to the function of the diodes 62C and 63C, AC power from the AC power supply 1 is not supplied to the communication circuits 62A, 62B, 63A, and 63B.

When the second DC-voltage smoothing unit 32 is charged, a voltage is applied to the control-power-supply generation unit 33. The control-power-supply generation unit 33 starts operating. Power is then supplied from the control-power-supply generation unit 33 to the first outdoor-device control unit 51. The first outdoor-device control unit 51 starts operating. At this time point, the control-power-supply relay 34 is off, and therefore the second outdoor-device control unit 52 does not start operating. First, the first outdoor-device control unit 51 having started operating turns on the second outdoor power-feed switching relay 13D. Power from the AC power supply 1 is then supplied to the diode 31 via the first noise reduction unit 11, the second outdoor power-feed switching relay 13D, and the surge-current suppression resistor 13E. In the case where the voltage applied from the AC power supply 1 is lower than the voltage of the second DC-voltage smoothing unit 32, the diode 31 operates as a reverse-voltage prevention diode to prevent a backflow to the AC power supply 1.

Next, the first outdoor-device control unit 51 also turns on the communication-power-supply relay 81, and thereafter turns off the first outdoor power-feed switching relay 13B. When the first outdoor power-feed switching relay 13B is turned off, a supply of power from the indoor devices 3A and 3B via the communication lines 100A and 100B to the outdoor device 2 is interrupted. A supply of power to the control-power-supply generation unit 33 is then performed starting from the AC power supply 1 via the second outdoor power-feed switching relay 13D.

Meanwhile, in the above operation, the indoor devices 3A and 3B operate their respective power-feed switching units to start a supply of AC power to the communication lines 100A and 100B. After a lapse of a given time period, the indoor devices 3A and 3B operate their respective power-feed switching units again to return to the original state that is before they start a supply of AC power to the communication lines 100A and 100B, and stop the supply of AC power to the communication lines 100A and 100B. Therefore, it is possible for the indoor devices 3A and 3B to transmit and receive various types of information including operational information to and from communication circuits in the outdoor device 2. That is, the communication lines 100A and 100B function as a power feed path to the outdoor device 2 only for a given time period when the outdoor device 2 starts operating. After a lapse of the given time period, the communication lines 100A and 100B stop functioning as a power feed path, and then function as a communication line. The given time period up until the indoor devices 3A and 3B operate their respective power-feed switching units again is predetermined in consideration of the operating time period from when the first outdoor-device control unit 51 starts operating to when the first outdoor-device control unit 51 completes the control for turning on the second outdoor power-feed switching relay 13D and the communication-power-supply relay 81. More specifically, the given time period up until the indoor devices 3A and 3B operate their respective power-feed switching units again is determined so as to become longer than the time period up until the first outdoor-device control unit 51 completes the control for turning on the second outdoor power-feed switching relay 13D and the communication-power-supply relay 81.

As described above, upon completion of the control on the first outdoor power-feed switching relay 13B, the second outdoor power-feed switching relay 13D, and the communication-power-supply relay 81, the first outdoor-device control unit 51 turns on the control-power-supply relay 34 to start a supply of power to the second outdoor-device control unit 52, and causes the second outdoor-device control unit 52 to start operating. The timing at which the control-power-supply relay 34 is turned on is not limited thereto; the control-power-supply relay 34 may be turned on before the start-up of the outdoor device 2. Further, because the control-power-supply relay 34 is not an essential constituent element, it may not necessarily be provided.

Next, the first outdoor-device control unit 51 transmits and receives various types of information including operating-state information and setting information to and from the indoor devices 3A and 3B respectively through the communication lines 100A and 100B, and the communication circuits 62A, 62B, 63A, and 63B. The first outdoor-device control unit 51 forwards various types of information to the second outdoor-device control unit 52, including operating-state information and setting information received from the indoor devices 3A and 3B. According to the various types of information forwarded from the first outdoor-device control unit 51, the second outdoor-device control unit 52 determines whether it is necessary to drive a compressor. When the second outdoor-device control unit 52 determines that it is necessary to drive a compressor, it turns on the first AC power-supply relay 21. When the first AC power-supply relay 21 is turned on, AC power from the AC power supply 1 is supplied to the first DC-voltage smoothing unit 24 through the first noise reduction unit 11, the first AC power-supply relay 21, the first inrush-current suppression resistor 21B, and the diode 21C. An inrush current generated at this time is suppressed by the first inrush-current suppression resistor 21B. The first DC-voltage smoothing unit 24 applies a voltage to the compressor driving unit 25 required for the operation of the compressor driving unit 25. Therefore, the capacitance of the first DC-voltage smoothing unit 24 is set 10 or more times greater than the capacitance of the second DC-voltage smoothing unit 32.

The first AC-DC conversion unit 23 converts AC power to DC power, and applies a DC voltage to the first DC-voltage smoothing unit 24. The compressor driving unit 25 starts operating by the voltage applied by the first DC-voltage smoothing unit 24, and drives a compressor.

The second outdoor-device control unit 52 monitors the voltage of the first DC-voltage smoothing unit 24 after the first AC power-supply relay 21 is turned on. Upon detecting that the voltage of the first DC-voltage smoothing unit 24 becomes equal to or greater than a set threshold, or upon detecting that voltage variations in the first DC-voltage smoothing unit 24 fall within a set threshold range, the second outdoor-device 2 control unit 52 turns on the second AC power-supply relay 22, and turns off the first AC power-supply relay 21. By operating the first and second AC power-supply relays 21 and 22 in the manner as described above, a current flows through the first inrush-current suppression resistor 21B only at the early stage of driving of a compressor. Therefore, power consumption in the first inrush-current suppression resistor 21B can be suppressed.

Also after the start of driving a compressor, the first outdoor-device control unit 51 transmits and receives various types of information including operational information to and from the indoor devices 3A and 3B. The various types of received information are forwarded to the second outdoor-device control unit 52 as needed.

According to the various types of information received from the indoor devices 3A and 3B through the first outdoor-device control unit 51, the second outdoor-device control unit 52 operates the compressor driving unit 25 so as to drive a compressor. The second outdoor-device control unit 52 controls the first AC-DC conversion unit 23 that includes a boost chopper circuit capable of boosting the voltage, and causes the first AC-DC conversion unit 23 to generate a voltage to be applied to the first DC-voltage smoothing unit 24.

A semiconductor element in the boost chopper circuit may be made of silicon, or may be made of a wide bandgap semiconductor. SiC, GaN, or diamond may be exemplified as the wide bandgap semiconductor. A switching element or a diode element made of a wide bandgap semiconductor has a high voltage resistance and a high allowable current density. Therefore, it is possible to downsize the switching element or the diode element. Accordingly, it is also possible to downsize the device. Further, a switching element or a diode element made of a wide bandgap semiconductor has a high heat resistance. Therefore, it is also possible to downsize a radiation fin of a heat sink. Accordingly, it is possible to further downsize the device. Furthermore, a switching element or a diode element made of a wide bandgap semiconductor results in low power loss. Therefore, it is possible to achieve high efficiency of the switching element or the diode element. Accordingly, it is possible to achieve high power-conversion efficiency and power savings. While it is desirable that all the semiconductor elements in the boost chopper circuit are made of a wide bandgap semiconductor, the present invention is not limited thereto. Some of the switching elements and diode elements may be made of a wide bandgap semiconductor. Also in this case, it is still possible to downsize the device and to achieve high efficiency and power savings.

The first DC-voltage smoothing unit 24 and the second DC-voltage smoothing unit 32 are connected through the diode 41. The voltage of the first DC-voltage smoothing unit 24 is set higher than the voltage of the second DC-voltage smoothing unit 32 by the first AC-DC conversion unit 23. The diode 41 is provided in one direction from the first DC-voltage smoothing unit 24 to the second DC-voltage smoothing unit 32. Therefore, a charge current flows from the first DC-voltage smoothing unit 24 to the second DC-voltage smoothing unit 32. Accordingly, the voltage of the second DC-voltage smoothing unit 32 is a DC voltage that is decreased from the voltage of the first DC-voltage smoothing unit 24 by the forward voltage of the diode 41.

The control-power-supply generation unit 33 operates by the voltage of the second DC-voltage smoothing unit 32 having been charged with the charge current as described above. The capacitance of the first DC-voltage smoothing unit 24 is set 10 or more times greater than the capacitance of the second DC-voltage smoothing unit 32. The voltage of the second DC-voltage smoothing unit 32 is maintained at a constant voltage by the first DC-voltage smoothing unit 24. Therefore, the capacitance of the second DC-voltage smoothing unit 32 can be set to a minimum value as possible to start-up the outdoor device 2. Accordingly, the second DC-voltage smoothing unit 32 can be downsized, and its cost can be reduced.

Further, in the outdoor device 2, there is a case where it is unnecessary to operate the compressor driving unit 25, and it is desired to suppress the standby power and reactive power consumption in a state of maintaining the supply of power to the outdoor device 2. In that case, as an example, when it is desired to enable the control for preventing refrigerant stagnation in order to protect the compressor, the second outdoor-device control unit 52 turns off the first AC power-supply relay 21 and the second AC power-supply relay 22. When the first AC power-supply relay 21 and the second AC power-supply relay 22 are turned off, AC power is not supplied to the first AC-DC conversion unit 23, and therefore a DC voltage is not generated to the first DC-voltage smoothing unit 24. The DC voltage of the first DC-voltage smoothing unit 24 becomes lower than the DC voltage of the second DC-voltage smoothing unit 32. However, as the diode 41 can block a backflow from the second DC-voltage smoothing unit 32 to the first DC-voltage smoothing unit 24, power consumption in the first DC-voltage smoothing unit 24 can be prevented.

The first outdoor-device control unit 51, and the second outdoor-device control unit 52, stop the operation of actuators such as a four-way valve, an electronic expansion valve, and a compressor. This results in lower power consumption in the control-power-supply generation unit 33, and makes it possible to reduce the standby power consumption. In the case of further reducing the standby power consumption, the first outdoor-device control unit 51 turns off the control-power-supply relay 34 to stop a supply of power to the second outdoor-device control unit 52, and then power consumption in the control-power-supply generation unit 33 is further decreased. This makes it possible to further reduce the standby power consumption.

When the first AC power-supply relay 21 and the second AC power-supply relay 22 are turned off, distribution of a current through the first noise reduction unit 11 is maintained, while distribution of a current through the second noise reduction unit 12 is stopped. Therefore, no reactive power is generated in the second noise reduction unit 12. In the manner as described above, it is also possible to reduce reactive power consumption in the second noise reduction unit 12.

As illustrated in FIG. 1, the power-supply path to the diode 31 is branched from a point between the first noise reduction unit 11 and the second AC power-supply relay 22. Even when the second AC power-supply relay 22 is turned off, a supply of power to the second DC-voltage smoothing unit 32 is still maintained, and the operation of the first outdoor-device control unit 51 can also be continued. At this time, the first noise reduction unit 11 can suppress leakage of noise generated in the control-power-supply generation unit 33 to the AC power supply 1.

There is a case where both the indoor devices 3A and 3B are not in operation and the compressor driving unit 25 does not need to drive a compressor, thereby shifting to the state of interrupting the supply of power to the outdoor device 2. In that case, the second outdoor-device control unit 52 first turns off both the first AC power-supply relay 21 and the second AC power-supply relay 22 to interrupt the supply of power to the first AC-DC conversion unit 23. Next, the first outdoor-device control unit 51 turns off the control-power-supply relay 34 to interrupt the supply of power to the second outdoor-device control unit 52. Because the control-power-supply relay 34 is turned off, power is not supplied to the second outdoor-device control unit 52. Therefore, both the first AC power-supply relay 21 and the second AC power-supply relay 22 are maintained in an off state. Accordingly, regardless of the control executed by the second outdoor-device control unit 52, the first outdoor-device control unit 51 may execute only the control for turning off the control-power-supply relay 34. Next, the first outdoor-device control unit 51 turns off the second outdoor power-feed switching relay 13D, thereby stopping the supply of AC power to the outdoor device 2. The control-power-supply generation unit 33 operates by the voltage of the first DC-voltage smoothing unit 24 and the voltage of the second DC-voltage smoothing unit 32. When the voltage of the first DC-voltage smoothing unit 24 and the second DC-voltage smoothing unit 32 falls below an operation limit voltage of the control-power-supply generation unit 33, then the control-power-supply generation unit 33 cannot generate power to be supplied to the first outdoor-device control unit 51. Therefore, the first outdoor-device control unit 51 stops operating. When the first outdoor-device control unit 51 stops operating, the first outdoor power-feed switching relay 13B, which has been maintained in an off state by the first outdoor-device control unit 51, is turned on. This makes it possible to start-up the outdoor device 2 by a supply of power from the indoor devices 3A and 3B. In the case of starting-up the outdoor device 2, the indoor device 3A or the indoor device 3B supplies power through the communication line 100A or the communication line 100B to the outdoor device 2.

As described above, in the air conditioning apparatus according to the present embodiment, the outdoor device 2 includes: the first AC power-supply relay 21; the second AC power-supply relay 22; the first outdoor power-feed switching relay 13B; and the second outdoor power-feed switching relay 13D. In a state where the outdoor device 2 does not need to operate, by turning off the first AC power-supply relay 21, the second AC power-supply relay 22, and the second outdoor power-feed switching relay 13D, while turning on the first outdoor power-feed switching relay 13B, the outdoor device 2 interrupts the supply of AC power to the first AC-DC conversion unit 23 and the diode 31, and is capable of supplying power to the control-power-supply generation unit 33 only from the indoor devices 3A and 3B. Due to the above described configuration, it is possible to reduce the standby power and reactive power consumption, and therefore power savings can be achieved.

Further, the communication-power-supply relay 81 is controlled by the first outdoor-device control unit 51. When the outdoor device 2 is in a power-supply interrupting state, the communication-power-supply relay 81 is turned off. When the outdoor device 2 is in a power-supply interrupting state, power from the AC power supply 1 is not supplied to the communication-power-supply generation unit 61. Therefore, when the outdoor device 2 is in a power-supply interrupting state, the standby power consumption in the communication-power-supply generation unit 61 is reduced.

Although the number of indoor devices to be connected to the outdoor device 2 is increased, it suffices that the number of communication circuits and diodes for communicating with the respective indoor devices is increased by the number of the indoor devices. It is unnecessary to increase the number of outdoor devices according to the number of the indoor devices. This can minimize the increase in the number of parts in association with the increase in the number of indoor devices to be connected to the outdoor device 2. Therefore, the substrate mounting area can be reduced, and also an increase in the parts and manufacturing costs can be prevented.

In the outdoor device 2 having started-up from the power-supply interrupting state, the input-power-supply detection unit 71 measures a positive half-wave cycle of the AC voltage applied to the communication-power-supply generation unit 61, and outputs this measurement result to the first outdoor-device control unit 51. The first outdoor-device control unit 51 can identify whether the AC voltage, applied to the communication-power-supply generation unit 61, is in a positive half-wave cycle.

Figure 2:
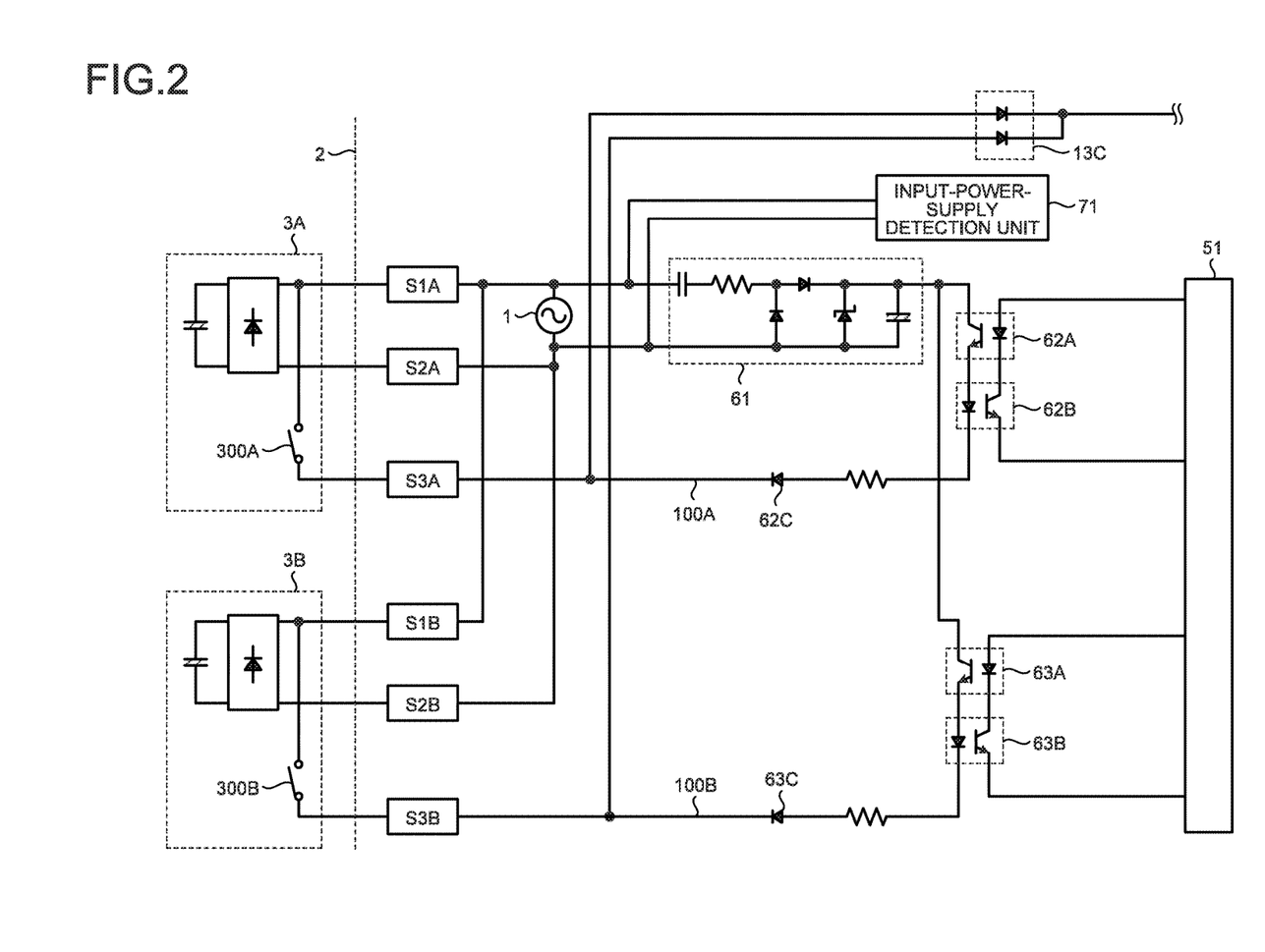
FIG. 2 is a diagram illustrating an example of an internal configuration of indoor devices, a communication-power-supply generation unit, and communication circuits.

FIG. 2 is a diagram illustrating an example of an internal configuration of: the indoor devices 3A and 3B; the communication-power-supply generation unit 61; and the communication circuits 62A, 62B, 63A, and 63B. When power is supplied from the AC power supply 1, the communication-power-supply generation unit 61 illustrated in FIG. 2 generates DC power required for communication between the indoor devices 3A and 3B, and the outdoor device 2. At this time, the voltage of generated DC power is adjusted by an internal Zener diode so as to become a specified voltage. The specified voltage for the Zener diode is equal to or less than one-tenth of the DC voltage converted from the AC voltage applied to the communication-power-supply generation unit 61. As an example, when the voltage of 200 V is applied from the AC power supply 1, the specified voltage for the Zener diode is equal to or less than 28 V.

As illustrated in FIG. 2, the indoor device 3A includes an indoor-device-side power-feed switching relay 300A that switches over the supply state of AC power to the communication line 100A. Also, the indoor device 3B includes an indoor-device-side power-feed switching relay 300B that switches over the supply state of AC power to the communication line 100B. When the outdoor device 2 is started-up from the power-supply interrupting state, it suffices that the indoor device 3A turns on the indoor-device-side power-feed switching relay 300A for a given period, or the indoor device 3B turns on the indoor-device-side power-feed switching relay 300B for a given period. The indoor-device-side power-feed switching relay 300A in the indoor device 3A, and the indoor-device-side power-feed switching relay 300B in the indoor device 3B, are controlled by their respective indoor devices 3A and 3B in an asynchronous manner.

When the AC voltage applied to the communication-power-supply generation unit 61 is in a positive half-wave cycle, the first outdoor-device control unit 51 transmits a voltage High to each of the indoor devices 3A and 3B simultaneously. When the frequency of the AC power supply 1 is 50 Hz, the first outdoor-device control unit 51 transmits a pulse at an interval equal to longer than 1 millisecond and equal to or shorter than 5 milliseconds.

When the AC voltage applied to the communication-power-supply generation unit 61 is in a positive half-wave cycle, and when the first outdoor-device control unit 51 transmits a voltage High to the indoor devices 3A and 3B, that is, when the first outdoor-device control unit 51 outputs a voltage High to the communication circuits 62A and 63A, then assuming as an example that a supply of AC power to the communication line 100A is set in the indoor device 3A, the anode-side voltage of the diode 62C on the communication line 100A becomes a DC voltage of the DC power generated by the communication-power-supply generation unit 61, and therefore becomes lower than the cathode-side voltage of the diode 62C. However, the diode 62C can suppress a current backflow to the communication circuits 62A and 62B. While the operation of the indoor device 3A has been described above, the operation of the indoor device 3B is identical to the operation of the indoor device 3A.

Figure 3:
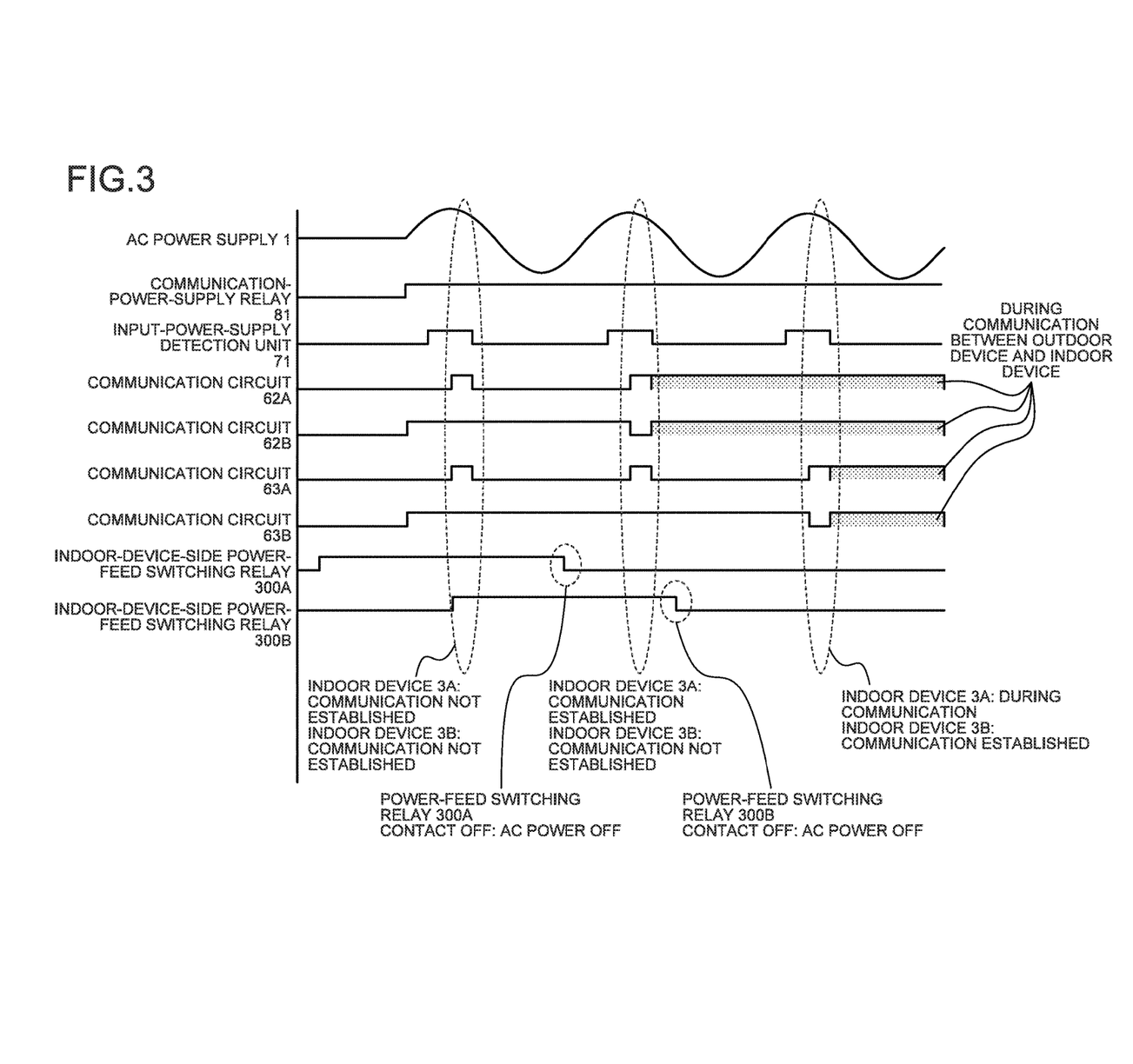
FIG. 3 is a diagram illustrating an example of an operation to determine the possibility of communication from an outdoor device, that is, an operation to determine whether it is possible for the outdoor device to communicate with the indoor devices.

FIG. 3 is a diagram illustrating an example of an operation to determine the possibility of communication from the outdoor device 2, that is, an operation to determine whether it is possible for the outdoor device 2 to communicate with the indoor devices 3A and 3B. As described above, when the first outdoor-device control unit 51 transmits a voltage High to the indoor devices 3A and 3B, and in response to this, receives a voltage Low via the communication circuits 62B and 63B, then the first outdoor-device control unit 51 determines that communication with the indoor devices 3A and 3B is established. When the communication between the outdoor device 2 and the indoor devices 3A and 3B is established, the operation of the outdoor device 2 is started. Thereafter, the first outdoor-device control unit 51 transmits and receives various types of information including operational information, operating-state information, and setting information to and from the indoor devices 3A and 3B that have established the communication with the outdoor device 2.

On the other hand, when the first outdoor-device control unit 51 transmits a voltage High to the indoor devices 3A and 3B, and despite this, does not receive a voltage Low via the communication circuits 62B and 63B, then the first outdoor-device control unit 51 determines that communication with the corresponding indoor device is not established. In this case, the first outdoor-device control unit 51 repeatedly transmits a voltage High to the indoor devices 3A and 3B when the AC voltage is in a positive half-wave cycle, that is, repeats the retransmission processing until the repetition reaches a predetermined number of retry times. In the case where communication with the corresponding indoor device is not established even though the repetition has reached the predetermined number of retry times, the first outdoor-device control unit 51 determines that an abnormality has occurred in the corresponding indoor device, and performs the abnormality processing. An example of the abnormality processing is to notify a user of the abnormality.

In the case where AC power is supplied from the indoor device 3A to the communication line 100A, and where AC power is supplied from the indoor device 3B to the communication line 100B, that is, when the indoor-device-side power-feed switching relays 300A and 300B in FIG. 2 are on, the first outdoor-device control unit 51 controls the communication circuits 62A and 63A that are transmission circuits to a state High; however, the communication circuits 62B and 63B that are reception circuits remain unchanged in a state High, and therefore the communication is not established. When AC power is not supplied from the indoor devices 3A and 3B to the communication lines 100A and 100B, that is, when the indoor-device-side power-feed switching relays 300A and 300B in FIG. 2 are off, the communication is established.

Figure 4:
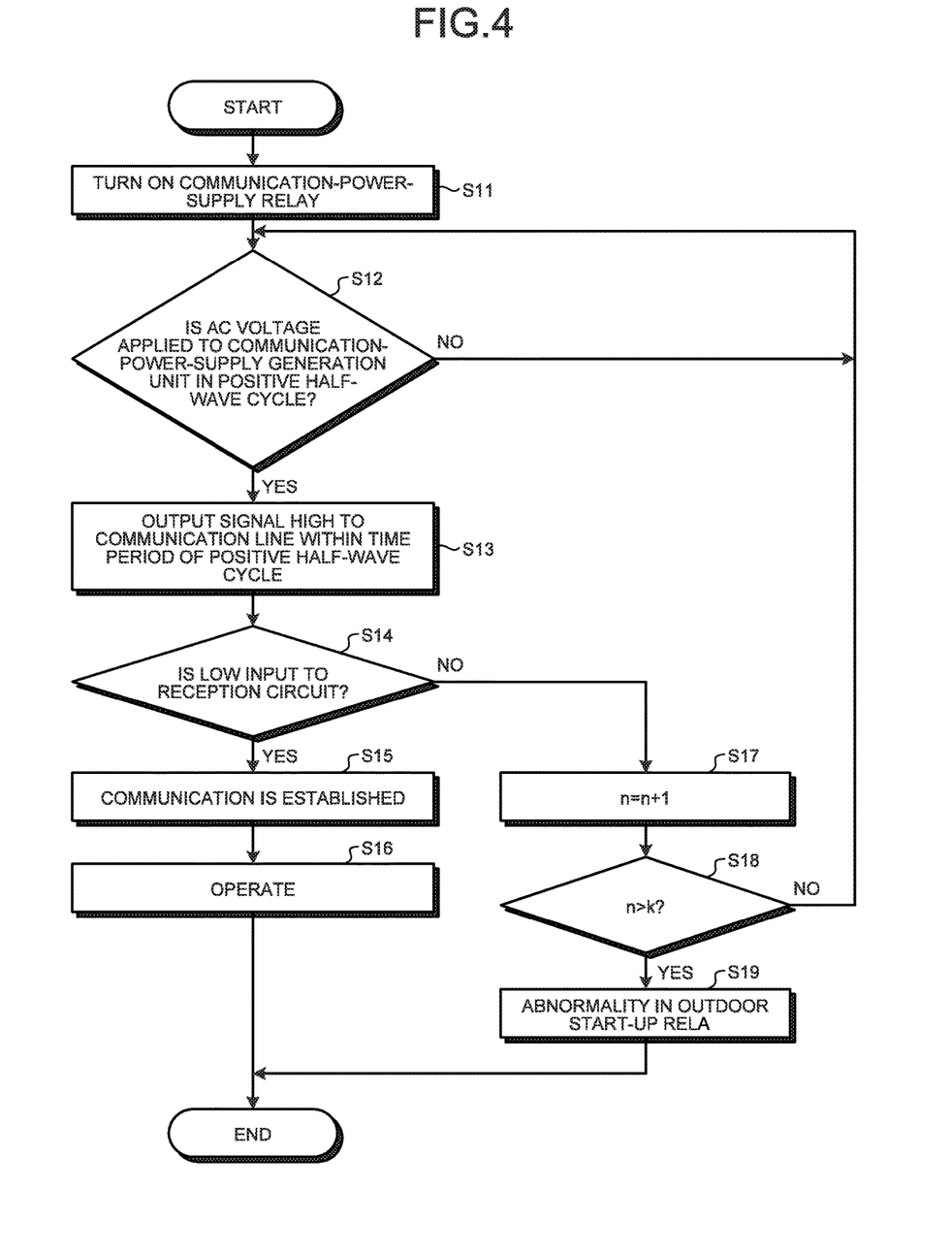
FIG. 4 is a flowchart illustrating an operation example of a first outdoor-device control unit to determine whether it is possible to communicate with the indoor devices.

FIG. 4 is a flowchart illustrating an operation example of the first outdoor-device control unit 51 to determine whether it is possible to communicate with the indoor devices 3A and 3B. First, the first outdoor-device control unit 51 turns on the communication-power-supply relay 81 (S11), and thereafter determines whether the AC voltage applied to the communication-power-supply generation unit 61 is in a positive half-wave cycle based on the detection result from the input-power-supply detection unit 71 (S12). When the AC voltage applied to the communication-power-supply generation unit 61 is not in a positive half-wave cycle (NO at S12), the first outdoor-device control unit 51 again determines whether the AC voltage is in a positive half-wave cycle. That is, the first outdoor-device control unit 51 continues to perform the determination until the AC voltage is in a positive half-wave cycle. When the AC voltage applied to the communication-power-supply generation unit 61 is in a positive half-wave cycle (YES at S12), the first outdoor-device control unit 51 outputs a signal High to the communication lines 100A and 100B within the time period of positive half-wave cycle (S13). The first outdoor-device control unit 51 then determines whether a signal Low is input to the reception circuits in response to the signal High at S13 (S14). When the signal Low is input to the reception circuits (YES at S14), the first outdoor-device control unit 51 determines that the communication is established (S15), operates (S16), and finishes the processing. When the signal Low is not input to the reception circuits (NO at S14), the first outdoor-device control unit 51 counts-up the number of retry times "n", that is, adds 1 to the number of retry times "n" (S17), and determines whether the number of retry times "n" exceeds an upper-limit value "k" of the number of retry times (S18). When the number of retry times "n" exceeds the upper-limit value "k" of the number of retry times (YES at S18), the first outdoor-device control unit 51 determines that an abnormality has occurred in an outdoor start-up relay (S19), and then finishes the processing. When the number of retry times "n" does not exceed the upper-limit value "k" of the number of retry times (NO at S18), the processing flow returns to S12.

As described above, the first outdoor-device control unit 51 detects a positive half-wave cycle of the AC voltage, applied to the communication-power-supply generation unit 61, based on the detection result from the input-power-supply detection unit 71, and transmits a signal High in a positive half-wave cycle to the indoor devices 3A and 3B through the communication circuits 62A and 63A that are transmission circuits to determine whether it is possible to communicate with the indoor devices 3A and 3B. The outdoor device 2 includes a unit that reliably establishes communication with a normal indoor device, because even when the asynchronous processing is performed on the indoor-device-side power-feed switching relays 300A and 300B in respective indoor devices connected to the outdoor device 2, the outdoor device 2 can still simultaneously perform the operation to determine whether communication with the respective indoor devices is established, that is, the operation to determine whether a signal Low is received in response to the signal High transmitted in a positive half-wave cycle of the AC voltage applied to the communication-power-supply generation unit 61. Accordingly, the outdoor device 2 can reduce the time period required to establish communication with an indoor device, and can prevent a failure of the parts in a communication circuit. Further, the outdoor device 2 can reliably eliminate an abnormal indoor device, and consequently can achieve a high quality air conditioning apparatus.

The diode 41 prevents a supply of power from the second DC-voltage smoothing unit 32 to the first DC-voltage smoothing unit 24. With this diode 41, when the first AC power-supply relay 21 and the second AC power-supply relay 22 are turned off during the operation standby period after the start-up of the outdoor device 2, there is no power consumption in the first DC-voltage smoothing unit 24. Further, the first noise reduction unit 11 and the second noise reduction unit 12 can reduce the standby power and reactive power consumption during the operation standby period after the start-up of the outdoor device 2.

Furthermore, the surge-current suppression resistor 13E has a lower impedance than the second inrush-current suppression resistor 13A has. The surge-current suppression resistor 13E and the second inrush-current suppression resistor 13A are capable of being switched over to each other by the first outdoor power-feed switching relay 13B and the second outdoor power-feed switching relay 13D. Therefore, at the time of supplying power from an AC power supply, when there is a possibility for an inrush current to flow to the second DC-voltage smoothing unit 32, a current flows through the second inrush-current suppression resistor 13A to suppress the inrush current. Except that case, the current path is switched over such that a current flows through the surge-current suppression resistor 13E. Accordingly, while a failure of the parts resulting from a surge current at the time of steady state is prevented, power consumption on the power feed path to the second DC-voltage smoothing unit 32 can be reduced, as compared to the case where the second DC-voltage smoothing unit 32 is connected to the second inrush-current suppression resistor 13A.

In the above explanations, the first DC-voltage smoothing unit 24 has been described as being provided outside of the compressor diving unit 25. However, the first DC-voltage smoothing unit 24 may be included in the compressor driving unit 25. Similarly, the second DC-voltage smoothing unit 32 has been described as being provided outside of the control-power-supply generation unit 33. However, the second DC-voltage smoothing unit 32 may be included in the control-power-supply generation unit 33.

As described above, the air conditioning apparatus according to the present embodiment is capable of selecting a current path from an AC power supply to a compressor driving unit, and selecting a current path from the AC power supply to a control-power-supply generation unit, based on the presence or absence of inrush current. A current path from the AC power supply 1 to the compressor driving unit 25 includes: a first current path, through which AC power is supplied from the AC power supply 1 to the compressor driving unit 25 through the first noise reduction unit 11, the first AC power-supply relay 21, and the first inrush-current suppression resistor 21B; and a second current path, through which AC power is supplied from the AC power supply 1 to the compressor driving unit 25 through the first noise reduction unit 11, the second AC power-supply relay 22, and the second noise reduction unit 12. By controlling on-off of the first AC power-supply relay 21 and the second AC power-supply relay 22, when there is a possibility for an inrush current to be generated such as upon starting a power supply from the AC power supply 1, the air conditioning apparatus selects the first current path to suppress an inrush current. When the air conditioning apparatus is in operation, the air conditioning apparatus selects the second current path to reduce the power consumption. A current path from the AC power supply 1 to the control-power-supply generation unit 33 includes: a third current path, through which AC power is supplied from the AC power supply 1 to the control-power-supply generation unit 33 through any one of the indoor devices 3A and 3B, the first outdoor power-feed switching relay 13B, and the second inrush-current suppression resistor 13A; and a fourth current path, through which AC power is supplied from the AC power supply 1 to the control-power-supply generation unit 33 through the first noise reduction unit 11, the second outdoor power-feed switching relay 13D, and the surge-current suppression resistor 13E having a lower impedance than the second inrush-current suppression resistor 13A. By controlling on-off of the first outdoor power-feed switching relay 13B and the second outdoor power-feed switching relay 13D, when there is a possibility for an inrush current to be generated such as upon starting a power supply from the AC power supply 1, the air conditioning apparatus selects the third current path to suppress an inrush current. When the air conditioning apparatus is in operation, the air conditioning apparatus selects the fourth current path to reduce the power consumption.

The configuration described in the above embodiment is only an example of the contents of the present invention. The configuration can be combined with other well-known techniques, and the present invention can be configured while modifying it without departing from the scope of the invention, such as omitting a part of the configuration.

The invention claimed is:

1. An air conditioning apparatus comprising:
   an outdoor device that is connected to an AC power supply; and
   a plurality of indoor devices that are connected to the AC power supply through the outdoor device, wherein
   the outdoor device includes:
   a first current path through which AC power is supplied from the AC power supply to a control-power-supply generation circuit through one of the indoor devices, a first outdoor power-feed switching relay, and an inrush-current suppression resistor; and
   a second current path through which AC power is supplied from the AC power supply to the control-power-supply generator through a noise reduction unit that includes an inductive reactance, a second outdoor power-feed switching relay, and a surge-current suppression resistor having a lower impedance than the inrush-current suppression resistor, and
   by controlling on-off of the first outdoor power-feed switching relay and the second outdoor power-feed switching relay:
   the outdoor device supplies AC power of the AC power supply to the control-power-supply generation circuit through the first current path or the second current path.

2. An air conditioning apparatus comprising:
   an outdoor device that is connected to an AC power supply; and
   a plurality of indoor devices that are connected to the AC power supply through the outdoor device, wherein
   the outdoor device includes:
   a first current path through which AC power is supplied from the AC power supply to a compressor driving circuit through a first noise reduction unit that includes an inductive reactance, a first AC power-supply relay, and a first inrush-current suppression resistor;
   a second current path through which AC power is supplied from the AC power supply to the compressor driving circuit through the first noise reduction unit, a second AC power-supply relay, and a second noise reduction unit that includes a capacitive reactance;
   a third current path through which AC power is supplied from the AC power supply to a control-power-supply generation circuit through one of the indoor devices, a first outdoor power-feed switching relay, and a second inrush-current suppression resistor; and
   a fourth current path through which AC power is supplied from the AC power supply to the control-power-supply generation circuit through the first reduction unit, a second outdoor power-feed switching relay, and a surge-current suppression resistor having a lower impedance than the second inrush-current suppression resistor, by controlling on-off of the first AC power-supply relay and the second AC power-supply relay:
   the outdoor device supplies AC power of the AC power supply to the compressor driving circuit through the first current path or the second current path, and
   by controlling on-off of the first outdoor power-feed switching relay and the second outdoor power-feed switching relay:
   the outdoor device supplies AC power of the AC power supply to the control-power-supply generation circuit through the third current path or the fourth current path.

3. The air conditioning apparatus according to claim 2, wherein an inrush current to the control-power-supply generation circuit is generated by a supply of power from the AC power supply.

4. The air conditioning apparatus according to claim 2, wherein at a time of starting an operation of the compressor driving circuit, the outdoor device turns on the first AC power-supply relay, and turns off the second AC power-supply relay, and thereafter turns off the first AC power-supply relay, and turns on the second AC power-supply relay.

5. The air conditioning apparatus according to claim 2, wherein it is possible to supply power from an input of the compressor driving circuit to an input of the control-power-supply generation circuit.

6. The air conditioning apparatus according to claim 2, wherein the outdoor device includes a diode in which an anode is connected to an input of the compressor driving circuit, and a cathode is connected to an input of the control-power-supply generation circuit.

7. The air conditioning apparatus according to claim 2, wherein
the outdoor device includes
a first outdoor-device control circuit that starts operating by using power from the control-power-supply generation circuit,
a second outdoor-device control circuit that operates by the compressor driving circuit, and
a power-supply control relay that is provided between the first outdoor-device control circuit and the second outdoor-device control circuit, and
when the compressor driving circuit does not operate, the control-power-supply generation circuit turns off the power-supply control relay to interrupt a power supply to the second outdoor-device control circuit.

8. The air conditioning apparatus according to claim 2, wherein
the third current path includes a communication line, the outdoor device includes
communication circuits that respectively communicate with the indoor devices, and
a communication-power-supply generation circuit that generates and supplies power to these communication circuits, and
when power is supplied from the third current path to the control-power-supply generation circuit, the outdoor device interrupts a supply of power to the communication-power-supply generation circuit.

9. The air conditioning apparatus according to claim 8, wherein
the outdoor device includes an input-power-supply detector,
the input-power-supply detector determines a polarity of an AC voltage applied to the communication-power-supply generation circuit,
during a period in which a voltage of AC power supplied to the communication-power-supply generation circuit has a positive polarity, whether a supply of AC power to the communication line via the indoor devices is performed is determined, and
when a supply of AC power to the communication line via the indoor devices is not performed, the outdoor device starts communication with the indoor devices.

10. The air conditioning apparatus according to claim 2, wherein an AC-DC conversion unit that includes a wide bandgap semiconductor element is provided at a stage before the compressor driving circuit.

* * * * *